(12) United States Patent
Bostick et al.

(10) Patent No.: US 9,009,606 B2
(45) Date of Patent: Apr. 14, 2015

(54) INSTANT MESSAGING ASSOCIATION TO REMOTE DESKTOPS

(75) Inventors: James Edward Bostick, Cedar Park, TX (US); John Michael Ganci, Jr., Cary, NC (US); John Paul Kaemmerer, Pflugerville, TX (US); Craig Matthew Trim, Sylmar, CA (US)

(73) Assignee: International Business Machines Corporation, Armonk, NY (US)

( * ) Notice: Subject to any disclaimer, the term of this patent is extended or adjusted under 35 U.S.C. 154(b) by 393 days.

(21) Appl. No.: 13/170,630

(22) Filed: Jun. 28, 2011

(65) Prior Publication Data

US 2013/0007639 A1    Jan. 3, 2013

(51) Int. Cl.
*H04L 12/58* (2006.01)
*G06Q 10/10* (2012.01)

(52) U.S. Cl.
CPC .............. *H04L 12/581* (2013.01); *H04L 51/04* (2013.01); *G06Q 10/107* (2013.01); *G06Q 10/10* (2013.01)

(58) Field of Classification Search
CPC .................................................. H04L 12/5815
USPC ............................ 715/758; 709/224; 704/235
See application file for complete search history.

(56) References Cited

U.S. PATENT DOCUMENTS

| | | | |
|---|---|---|---|
| 7,814,167 B2 | 10/2010 | George et al. | |
| 7,937,452 B2 | 5/2011 | Wynn et al. | |
| 2003/0050778 A1* | 3/2003 | Nguyen et al. | 704/235 |
| 2003/0157968 A1* | 8/2003 | Boman et al. | 455/563 |
| 2005/0021652 A1 | 1/2005 | McCormack | |
| 2005/0055405 A1* | 3/2005 | Kaminsky et al. | 709/206 |
| 2005/0055412 A1* | 3/2005 | Kaminsky et al. | 709/207 |
| 2005/0071433 A1* | 3/2005 | Shah | 709/207 |
| 2007/0288580 A1* | 12/2007 | Kaminsky et al. | 709/206 |
| 2009/0063677 A1* | 3/2009 | Forlenza et al. | 709/224 |
| 2009/0222739 A1 | 9/2009 | Schmieder et al. | |
| 2009/0228801 A1* | 9/2009 | Lee et al. | 715/730 |
| 2009/0254623 A1 | 10/2009 | Hones et al. | |
| 2010/0250692 A1* | 9/2010 | Kaminsky et al. | 709/206 |
| 2011/0041142 A1 | 2/2011 | Lin et al. | |

OTHER PUBLICATIONS

Symantec PCAnywhere User's Guide, Symantec Corporation (2006) (Symantec).*
Rogers, B. "A Gate to DOS [packet radio]." CQ Radio Amateur's Journal, vol. 46, No. 4, pp. 80-82. Apr. 1990. USA.

* cited by examiner

*Primary Examiner* — William Bashore
*Assistant Examiner* — Nathan Shrewsbury
(74) *Attorney, Agent, or Firm* — Edward J. Wixted, III; Nicholas L. Cadmus; Alexander Viderman

(57) ABSTRACT

A remote desktop capability includes a message area on the agent's remote desktop display. Incoming instant messages on an instant messaging application on the agent's primary desktop are passed through to the message area on the remote desktop display.

14 Claims, 4 Drawing Sheets

INSTANT MESSAGING ASSOCIATION TO REMOTE DESKTOPS

BACKGROUND

1. Field of the Invention

The invention relates generally to remote desktop services. In particular the invention relates to use of an instant messaging system by an agent while involved in a remote desktop session with a client.

2. Summary

A service person referred to herein as an agent opens a remote desktop connection with a person desiring assistance, referred to herein as a client. The agent's workstation has a desktop which shows what is displayed on the client's desktop, allowing the agent to control the client's workstation using, for example, the agent's keyboard, mouse and display.

The agent has an instant messaging application running on his primary desktop, but this is not visible on his screen display while in the remote desktop connection. The present invention provides a solution to this problem by providing a message area on the remote desktop display. Incoming messages are passed through to the desktop display.

DETAILED DESCRIPTION

Figure 1:
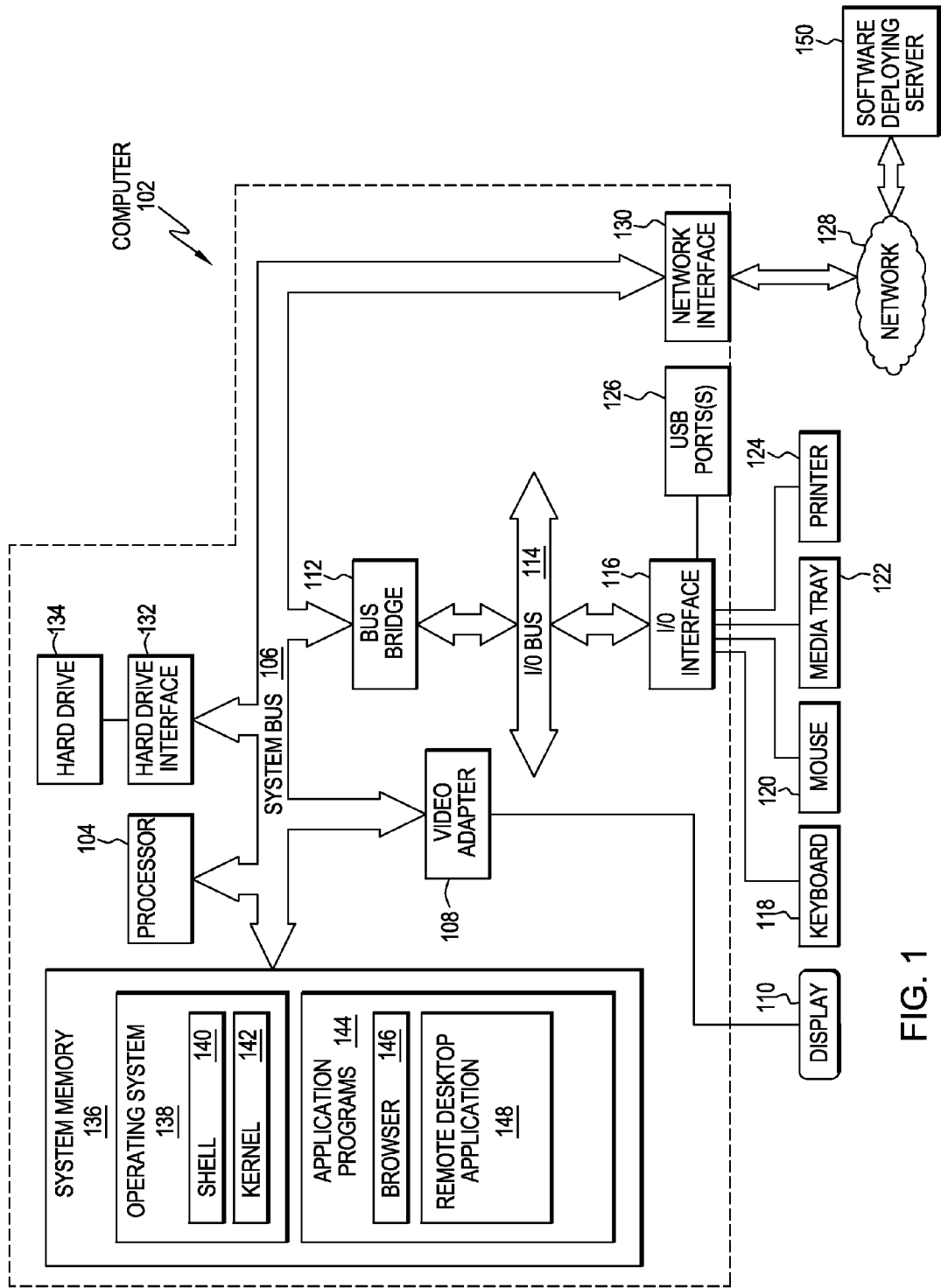
FIG. 1 depicts an exemplary computer system which may be used in the present invention.

For a better understanding of the present invention, together with further objects, advantages and capabilities thereof, reference is made to the following disclosure and the appended claims in connection with the above-described drawings.

As will be appreciated by one skilled in the art, aspects of the present invention may be embodied as a system or computer program product. Accordingly, aspects of the present invention may take the form of an entirely hardware embodiment, and entirely software embodiment (including firmware, resident software, micro-code, etc.), or an embodiment combining software and hardware aspects that may all generally be referred to herein as an "apparatus", "module", or "system." Furthermore, aspects of the present invention may take the form of a computer program product embodied in one or more computer readable storage mediums(s) having computer readable program code embodied thereon.

A computer readable storage medium may be, for example, but not limited to, an electronic, magnetic, optical, electro-magnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Computer program code for carrying out operations for aspects of the present invention may be written in any combination of one or more programming languages, including an object oriented programming language, such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process, such that the instructions which execute on the computer or other programmable apparatus provide processes for implementing the functions/acts specified in the flowchart and/or block diagram block or blocks.

With reference now to the figures, and in particular to FIG. 1, there is depicted a block diagram of an exemplary computer 102, which may be utilized by the present invention. Note that some or all of the exemplary architecture, including both depicted hardware and software, shown for and within computer 102 may be utilized by software deploying server 150.

Computer 102 includes a processor 104 that is coupled to a system bus 106. Processor 104 may utilize one or more processors, each of which has one or more processor cores. A video adapter 108, which drives/supports a display 110, is also coupled to system bus 106. System bus 106 is coupled via a bus bridge 112 to an input/output (I/O) bus 114. An I/O interface 116 is coupled to I/O bus 114. I/O interface 116 affords communication with various I/O devices, including a keyboard 118, a mouse 120, a media tray 122 (which may include storage devices such as CD-ROM drives, multi-media interfaces, etc.), a printer 124, and external USB port(s) 126. While the format of the ports connected to I/O interface 116 may be any known to those skilled in the art of computer architecture, in one embodiment some or all of these ports are universal serial bus (USB) ports.

As depicted, computer 102 is able to communicate with a software deploying server 150 using a network interface 130. Network 128 may be an external network, such as the Internet, or an internal network, such as an Ethernet or a virtual private network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory is defined as a lowest level of volatile memory in computer 102. This volatile memory includes additional higher levels of volatile memory (not shown), including, but not limited to, cache memory, registers and buffers. Data that populates system memory 136 includes computer 102's operating system (OS) 138 and application programs 144.

OS 138 includes a shell 140, for providing transparent user access to resources such as application programs 144. Generally, shell 140 is a program that provides an interpreter and an interface between the user and the operating system. More specifically, shell 140 executes commands that are entered into a command line user interface or from a file. Thus, shell 140, also called a command processor, is generally the highest level of the operating system software hierarchy and serves as a command interpreter. The shell provides a system prompt, interprets commands entered by keyboard, mouse, or other user input media, and sends the interpreted command(s) to the appropriate lower levels of the operating system (e.g., a kernel 142) for processing. Note that while shell 140 is a text-based, line-oriented user interface, the present invention will equally well support other user interface modes, such as graphical, voice, gestural, etc.

As depicted, OS 138 also includes kernel 142, which includes lower levels of functionality for OS 138, including providing essential services required by other parts of OS 138 and application programs 144, including memory management, process and task management, disk management, and mouse and keyboard management.

Application programs 144 include a renderer, shown in exemplary manner as a browser 146. Browser 146 includes program modules and instructions enabling a world wide web (WWW) client (i.e., computer 102) to send and receive network messages to the Internet using hypertext transfer protocol (HTTP) messaging, thus enabling communication with software deploying server 150 and other computer systems.

Application programs 144 in computer 102's system memory (as well as software deploying server 150's system memory) also include a remote desktop application 148. This includes code for implementing the processes described below, including those described in FIG. 2. In one embodiment, computer 102 is able to download application 148 from software deploying server 150, including in an on-demand basis, wherein the code in application 148 is not downloaded until needed for execution to define and/or implement the invention described herein. Note further that, in one embodiment of the present invention, software deploying server 150 performs all of the functions associated with the present invention, thus freeing computer 102 from having to use its own internal computing resources to execute application 148.

The hardware elements depicted in computer 102 are not intended to be exhaustive, but rather are representative to highlight essential components required by the present invention. For instance, computer 102 may include alternate memory storage devices such as magnetic cassettes, digital versatile disks (DVDs), Bernoulli cartridges, and the like. These and other variations are intended to be within the spirit and scope of the present invention.

Figure 2:
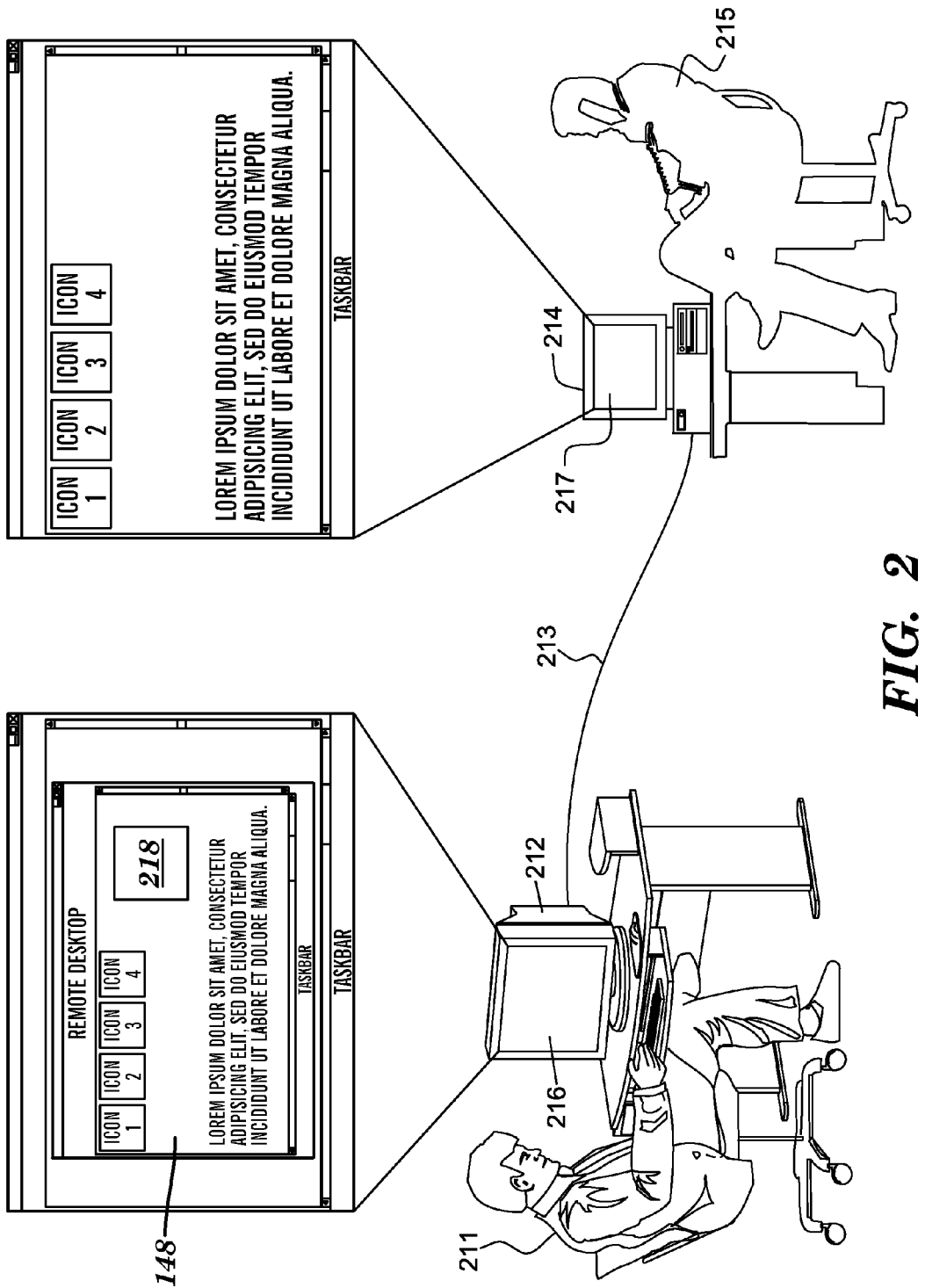
FIG. 2 is a diagram of an agent operating a remote desktop connection with a client in accordance with the present invention.
Figure 3:
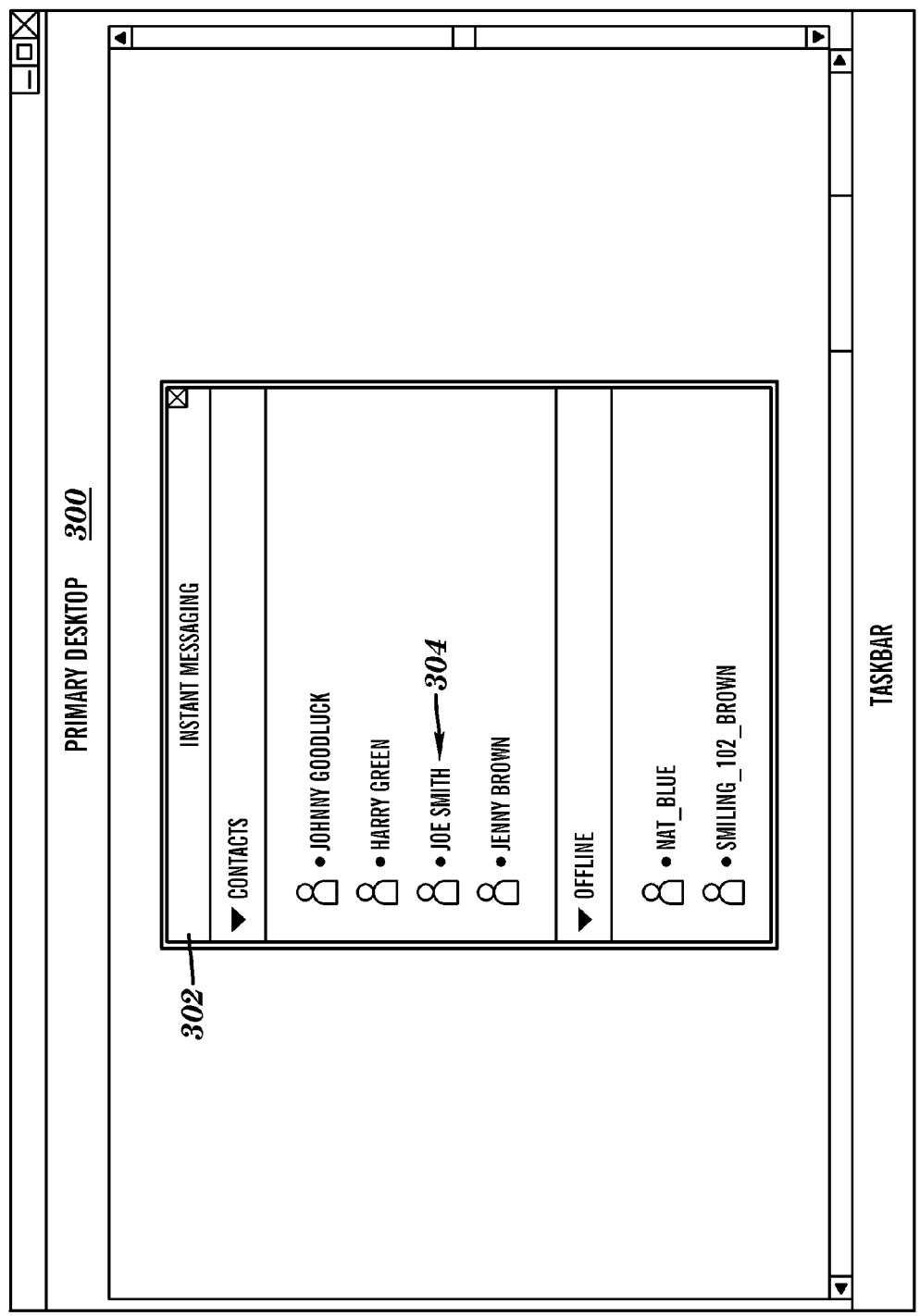
FIG. 3 is a diagram of an instant messaging application running on agent's primary desktop in accordance with the present invention.

In FIG. 2, there is shown agent 211 operating workstation 212 with associated keyboard and mouse, and having display 216. Agent 211 has launched an instant messaging application 302 on his primary desktop 300 of his workstation 212, shown in FIG. 3. Agent 211 has also activated a remote desktop application 148 in a second desktop on workstation 212. It should be noted that instant messaging application 300 running on agent's 211 primary desktop 300 is not visible on his screen display 216 while agent 211 is in remote desktop application 148.

The remote desktop application 148 is activated in order to assist client 215, who is using her workstation 214 with display 217. Workstations 212 and 214 are interconnected 213 via any connection method known in the art, such as, but not limited to, hardwire, fiber optic, radio, infrared, or acoustic. The interconnection may use any known protocols and levels, such as, but not limited to, Ethernet, token ring, HTTP, TCP/IP, WiFi, SMS, Cloud, or internet.

The remote desktop capability shows on agent's 211 display screen 216 what is shown on client's 215 display screen 217. Display screen 216 also has a message area 218 shown in detail in FIG. 4. The message area 218 may display incoming instant messages 220 from the launched instant messaging application 302 on agent's 211 primary desktop 300 which are passed through from the primary desktop 300 to the message area 218.

Figure 4:
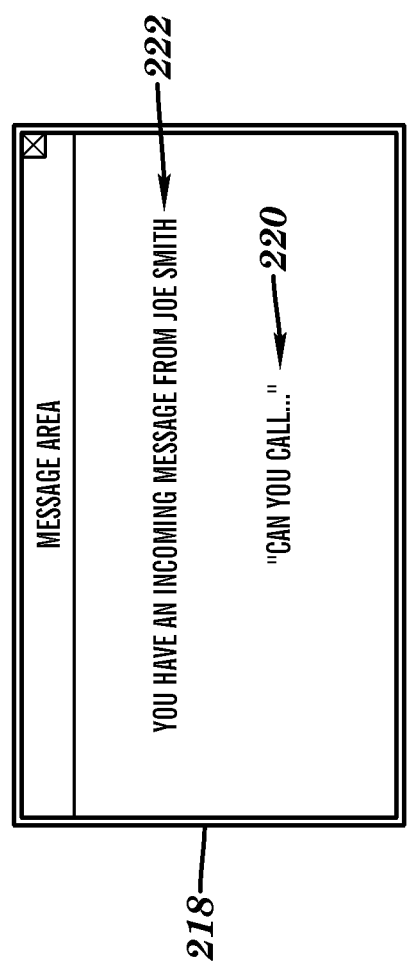
FIG. 4 is a diagram of a message area to display incoming instant messages from the launched instant messaging application of FIG. 3 in accordance with the present invention.

As illustrated in FIG. 4, the message area 218 may display a summary 222 of an incoming instant message 220, such as the name of the user who sent it, the first few words sent, or any other summary. The message area 218 may also provide a capability for automatically notifying the sender 304 of an instant messaging status, such as "not available" in reply to the incoming instant message 220, whenever agent 211 activates a remote desktop capability application 148. Furthermore, the message area 218 may also be configured to allow agent 211 to directly enter a response to the incoming instant message without affecting the remote desktop application 148 operation.

The message area 218 on display screen 216 is not normally visible to client 215 on display screen 217.

A plug in is provided for the instant messaging application 302 in the primary desktop 300 of workstation 212 that is configured to pass messages through to the message area 218 in the remote desktop 148. An instant message receiver is also configured in the remote desktop 148 to receive and display the messages in the message area 218.

While there have been shown and described what are at present considered the preferred embodiments of the invention, it will be obvious to those skilled in the art that various changes, and modifications may be made therein without departing from the scope of the invention as defined by the appended claims.

What is claimed is:

1. An instant message system, comprising:
    a processor having a first desktop and a second desktop, the first desktop comprises a primary desktop operable to display an instant message window, the second desktop comprises a remote desktop;

a message area within the second desktop of the processor; and an instant messaging plug in running on the processor, the instant messaging plug in configured to pass an incoming message from an instant messaging, application in the first desktop to a message receiver within the second desktop of the processor, wherein the message receiver is configured to receive and display the incoming, instant message in the message area while the first desktop is not visible, and wherein the first desktop is further configured to allow a response to the incoming instant message to be entered in the message area within the second desktop of the processor.

2. The system of claim 1, further comprising a second processor and wherein the remote desktop displays what is shown on a screen of the second processor.

3. The system of claim 2, wherein the second processor is located at a different geographical location from the first processor.

4. The system of claim 1, wherein the message area displays a summary of the incoming instant message to the instant messaging application in the first desktop as another instant message in the message area within the second desktop.

5. The system of claim 1, further comprising another instant messaging plug in running on the processor for detecting that the remote desktop is active, and for automatically changing an instant messaging status that is sent in reply to the incoming instant message.

6. An instant messaging method, comprising:

launching an instant messaging application on a first desktop of a processor, the first desktop comprises a primary desktop;

activating a remote desktop capability in a second desktop of the processor, the remote desktop displaying a desktop of a remotely located processor;

activating an instant messaging plug in running on the processor, the instant messaging plug in configured to pass an incoming instant message from the instant messaging application in the first desktop to a message receiver within the second desktop of the processor, wherein the message receiver is configured to receive and display the incoming instant message in the message area while the first desktop is not visible;

in response to receiving the incoming instant message by the instant, messaging application, passing the incoming instant message, by the instant messaging plug in, to the second desktop of the processor;

opening a message area in the second desktop to display the incoming instant message, while the first desktop is not visible; and receiving a response, in the message area in the second desktop, to the incoming instant message.

7. The method of claim 6, wherein the message area displays a summary of the incoming instant message to the instant messaging application in the first desktop as another instant message in the message area within the second desktop.

8. The method of claim 6, further comprising detecting that the remote desktop is active, and automatically changing an instant messaging status that is sent in reply to the incoming instant message.

9. A computer program product for handling instant messages in a desktop application, the computer program product comprising one or more computer-readable tangible storage devices and a plurality of program instructions stored on at least one of the one or more computer-readable tangible storage devices, the plurality of program instructions comprising:

program instructions to launch an instant messaging application on a first desktop of a processor, the first desktop comprises a primary desktop;

program instructions for activating a remote desktop capability in a second desktop of the processor, the remote desktop displaying a desktop of a remotely located second processor;

program instructions for activating an instant messaging plug in on the processor, the instant messaging plug in configured to pass an incoming instant message from the instant messaging application in the first desktop to a message receiver within the second desktop of the processor, wherein the message receiver is configured to receive and display the incoming instant message in the message area while the first desktop is not visible;

program instructions for passing the incoming instant message to the second desktop of the processor, in response to receiving the incoming instant message to the instant messaging application;

program instructions for opening a message area in the second desktop to display the incoming instant message; and program instructions for receiving a response in the message area in the second desktop, to the incoming instant message.

10. The computer program product of claim 9, wherein the message area displays a summary of the incoming instant message as another instant message.

11. The computer program product of claim 9, further comprising program instructions for detecting that the remote desktop is active, and automatically changing an instant messaging status that is sent in reply to the incoming instant message, and wherein the program instructions are stored on at least one of the one or more computer-readable tangible storage devices.

12. The system of claim 1, wherein the first desktop and the second desktop are simultaneously active.

13. The method of claim 6, wherein the first desktop and the second desktop are simultaneously active.

14. The computer program product of claim 9, wherein the first desktop and the second desktop are simultaneously active.

* * * * *